Jan. 4, 1955     I. W. COX     2,698,766

PRESSURE RESPONSIVE POWER ELEMENTS

Filed Nov. 19, 1951

INVENTOR.
IRVIN W. COX
BY
ATTORNEY

2,698,766

PRESSURE RESPONSIVE POWER ELEMENTS

Irvin W. Cox, West Allis, Wis., assignor to Cutler-Hammer, Inc., Milwaukee, Wis., a corporation of Delaware Application November 19, 1951, Serial No. 257,100

13 Claims. (Cl. 297—9)

This invention relates to improvements in pressure responsive power elements, such as those adapted to the temperature control of domestic refrigerators.

Power elements of this type are made and tested in large quantities, and every effort must be made to minimize loss due to "leakers."

One of the objects of this invention, therefore, is to provide a power element which is so designed that the percentage of rejects due to leakage is greatly reduced.

Other objects of this invention are to provide a power element which is: accurate in operation; small and compact thus requiring a minimum of space; and simple and inexpensive to make and yet strong and durable.

The first of these objects is attained by making dual seals at all joints. The use of dual seals has the effect of greatly reducing the loss due to leakage. Suppose, for example, that diaphragms made with a single welded seal have in testing developed one leaker in fifty. If two independent welded seals of the same quality are used in series the chance that leakage will exist in both welds of one diaphragm is reduced to one in twenty-five hundred.

The dual seal between the cup-like structural member and the diaphragm is made by one continuous resistance seam weld which simultaneously joins two spaced adjacent portions of the cup to opposite sides of the diaphragm. The dual seal between the cup and the capillary tube is obtained by a silver solder seal on the inside of the cup between the inner end of the tube and the cup and a lead or soft solder seal on the outside of the cup between the tube and the cup. The dual seal at the outer end of the capillary tube consists of a pressure closed joint between the walls of the tube and an electric arc weld at the end of the tube.

Accuracy in operation of the power element is obtained by using a corrugated diaphragm having the amplitude of the corrugations relatively proportioned so as to tend to obtain temperature linearity when a liquid in contact with its vapor is used as a thermometric fill. Accuracy is also enhanced by using the extended wall of the cup to provide two independent sets of lugs, one set for mounting the unit as a whole, and the other set for clamping the control assembly in a fixed position with respect to the diaphragm actuator.

Simplicity of construction and reduction in required space are obtained by making the diaphragm with a predetermined inherent resilience or spring characteristic so that it is self-loaded when charged, thus eliminating the necessity for an additional loading spring. Elimination of extra parts and reduction in weight are also accomplished by forming an actuating boss on the center of the diaphragm which directly contacts the mechanism to be controlled. This actuator will permit lateral motion between such mechanism and the diaphragm without disturbing proper axial adjustment therebetween.

The novel features which are considered characteristic of the invention are set forth with particularity in the appended claims. The invention itself, however, both as to its organization and its method of operation, together with additional objects and advantages thereof, will best be understood from the following description of a specific embodiment when read in connection with the accompanying drawing, in which:

Figure 1:
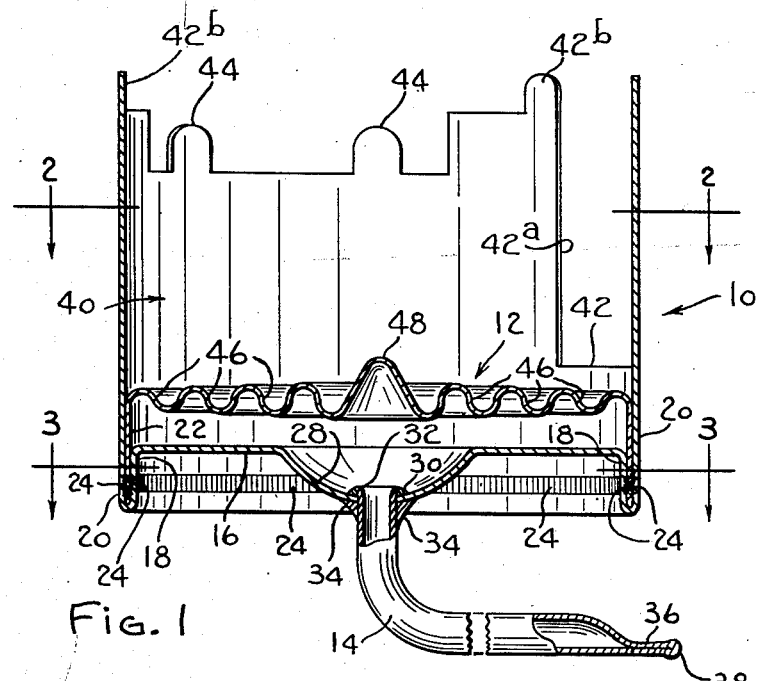
Figure 1 is an enlarged sectional view of a power element embodying the present invention.
Figures 2, 3:
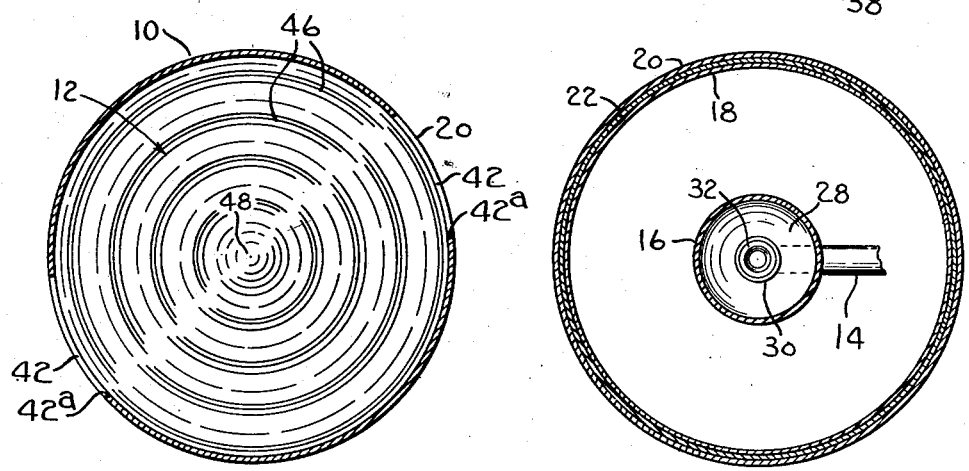
Fig. 2 is a sectional view taken on line 2—2 of Fig. 1.
Fig. 3 is a sectional view taken on line 3—3 of Fig. 1.

Referring to the drawing by reference numerals, the power element consists of a cup 10 to which is sealed a diaphragm 12 and a closed capillary tube 14 leading to the space between the cup and the diaphragm. The power element is charged with a fluid which will be in a partial vapor state in the range of ambient temperatures in which the element is designed to operate. Examples of suitable fluids are methyl chloride and Freon although other fluids may be used depending upon the application.

As has been previously pointed out, a dual seal at all joints will greatly reduce the incidence of leakers in manufacturing. The dual seal between the cup and diaphragm is obtained by forming an inwardly opening integral annular recess in the cup having spaced walls, providing the diaphragm with an annular flange, seating such flange in such recess, and welding such flange to each spaced wall. One way of making the recess in the cup is to draw the cup from blank stock into a cylindrical upper wall 20 with an integral bottom 16 re-entrant or depressed inwardly of such wall. This forms an inwardly opening recess between an inner wall 18 and the lower end of the cylindrical outer wall 20. The diaphragm 12 has an annular flange 22 which is seated in such recess to hold the body of the diaphragm spaced from the bottom 16. A continuous resistance weld 24 is then made between the flange 22 and each of walls 18 and 20. Both such welds may be made simultaneously in a seam welder the electrodes of which engage the outer surfaces of the walls 18 and 20. Entrance to or escape from the interior of the power element through such joint must be through both of the two spaced welded seals. In addition to the improvement in the sealing of such joint the construction of the cup with its re-entrant bottom greatly increases the rigidity of the element and permits the use of relatively thinner material in the cup.

Figure 4:
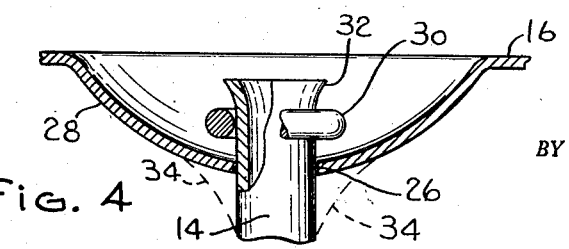
Fig. 4 is an enlarged fragmentary sectional view of the parts of the joint between the capillary tube and the cup, prior to uniting the same.

To provide a dual seal between the capillary tube 14 and the bottom 16, as best illustrated in Fig. 4, a central circular opening 26 is formed in any suitable manner in the center of a dished portion 28 at the time the cup is drawn, or thereafter. Before the diaphragm 12 is placed in the cup 10, the inner end of tube 14 is inserted upwardly through the opening 26, a ring of silver solder 30 is placed over such end, and the end flared as shown at 32. Alternatively, of course, the upper end of tube 14 might be initially flared (32), and the lower end of said tube inserted downwardly through solder ring 30 and opening 26. With capillary tube 14 properly positioned the solder and adjacent parts are brought to soldering temperature to melt the silver solder ring 30, and the solder upon cooling provides a sealing joint between the inner surface of the cup and the inner end portion of the tube. During cooling of the silver solder and the parts adjacent thereto a fillet of soft solder 34 is melted in place on the outside to afford an additional seal and to further unite tube 14 and portion 28 of cup 10. With the aforementioned parts assembled with respect to cup 10, the assembly may be washed free of the silver solder flux. Thereafter the diaphragm 12 is positioned within cup 10 and welded, as heretofore described. During such welding the capillary tube may be kept straight and perpendicular to the bottom 16 so as not to interfere with the rotation of the cup in the seam welder. Heat generated in the cup 10 as a result of such welding will not disturb the silver solder seal. Both joints therefore provide a dual seal between the tube and cup and make a rigid mechanical connection therebetween.

The end of the capillary tube, after the power element has been charged with the required quantity of a selected thermally expansible fluid, is cut off and a dual seal effected by the process described in Cox and Drugmand Patent No. 2,568,911, granted September 25, 1951. This seal consists of a pressure joint between the collapsed walls of the tube, as indicated at 36, a portion of which is held collapsed until completion of an electric arc weld at the cut end, indicated at 38.

Another feature of this power element is the manner in which the cylindrical body of the cup 10 provides a housing and support for mechanism (not shown) to be operated by the diaphragm. A preferred form of such mechanism is shown in my copending application, Serial No. 260,161, filed December 6, 1951, now Patent No. 2,671,839. Its outer cylindrical wall 20 extends above the diaphragm 12 to provide an interior space 40 within which may be housed the mechanism operated by the diaphragm 12. Gauge edges 42 are provided by cut-outs 42a provided in the wall 20 to accurately seat the mechanism with respect to the diaphragm 12. Tabs 44 may be used to hold the mechanism in place. Not only is space saved by this structure but a relatively inexpensive and extremely rigid and accurate unit is obtained.

Pairs of lugs 42b, 42b are provided at the extreme upper end of cup 10 (preferably at the respective opposite sides of cut-outs 42a, 42a) to provide for attachment of the complete control device to a mounting plate, such as the refrigerator escutcheon plate, or other suitable support.

The diaphragm 12 in the embodiment shown herein is preferably provided with annular concentric corrugations 46 the amplitude of which increases gradually from the outer corrugation to the inner corrugation. Such gradually increasing amplitude ends to impart a linear temperature characteristic (i. e., the linear deflection of the diaphragm, when subjected to pressure by a vapor in contact with its own liquid, is directly proportional to the temperature of that liquid) to the diaphragm. The diaphagm 12 is provided with a conical central projection 48 the apex of which is a spherical section. The projection 48 provides a direct contact between the power element and an operated mechanism (not shown) in such a manner as to permit relative sliding motion therebetween without changing the axial adjustment.

Also while I have herein disclosed diaphragm and cup members with resistance welded connections to provide a dual seal between the inside and outside of the diaphragm; it is to be understood that a dual seal may be obtained by soldering operations, or by using tin-plated cup and diaphragm members and applying pressure and heat in a well known manner.

I claim:

1. In a power element, a cup having a cylindrical wall and a bottom integral with said wall, said bottom being depressed inwardly of an end of said wall to form two spaced integrally connected sections, a diaphragm in said cup having an annular flange, said flange being seated between said sections, and a continuous weld between said flange and each of said sections to form two independent seals between said cup and diaphragm.

2. A power element of the character defined by claim 1 including a body of thermometric fill sealed therewithin and in which said diaphragm has an integral actuating boss and annular coplanar concentric corrugations, the amplitude of which corrugation increases gradually from the outer corrugation to the inner corrugation, said diaphragm by virtue of the specified corrugations having a temperature linear characteristic.

3. In a power element, a cup consisting of a cylindrical wall and a re-entrant integral bottom, there being an annular recess formed by said wall and said re-entrant bottom, a diaphragm in said cup having an annular flange seated in said recess, and a continuous seam weld between said flange and the sides of said recess to form a dual seal for said power element.

4. In a power element, a cup consisting of a peripheral wall and a re-entrant integral bottom, there being a peripheral recess formed by said wall and said bottom, a diaphragm in said cup having a flange seated in said recess, and a continuous seam weld between said flange and the sides of said recess to form a dual seal for said power element, said wall extending beyond said diaphragm and shaped to provide a housing and a support for mechanism operated by said diaphragm.

5. In a power element, a cup consisting of a cylindrical wall and a re-entrant integral bottom, there being an annular recess formed by said wall and said bottom, a diaphragm in said cup having an annular flange seated in said recess, and a continuous seam weld between said flange and the sides of said recess to form a dual seal for said power element, said wall extending beyond said diaphragm and shaped to provide a housing and a support for mechanism operated by said diaphragm.

6. In a power element, a cup consisting of a cylindrical wall and a re-entrant integral bottom, there being an annular recess formed by said wall and said bottom, a diaphragm in said cup having an annular flange seated in said recess, said diaphragm having a centrally positioned laterally projecting boss having an apex of spherical section adapted to directly engage mechanism to be controlled, and a continuous seam weld between said flange and the sides of said recess to form a dual seal for said power element, said wall extending beyond said diaphragm and shaped to provide a housing and a support for mechanism operated by said boss.

7. A power element designed to minimize the possibility of leakage at the joints thereof comprising a cup having an inwardly opening integral annular recess, a diaphragm in said cup having a flange fitting in said recess, a continuous resistance weld between said flange and each wall of said recess to form a dual seal between said diaphragm and said cup, said cup having an opening, a capillary tube having an inner end extending through said opening, a silver solder connection between said inner end and the inner surface of said cup, and a soft solder seal between said tube and the outside of said cup whereby a dual seal is formed between said cup and said tube.

8. A power element designed to minimize the possibility of leakage at the joints thereof comprising a cup having an inwardly opening integral annular recess, a diaphragm in said cup having a flange fitting in said recess, a continuous resistance weld between said flange and each wall of said recess to form a dual seal between said diaphragm and said cup, said cup having an opening, a capillary tube having an inner end extending through said opening, a silver solder connection between said inner end and the inner surface of said cup, a soft solder seal between said tube and the outside of said cup whereby a dual seal is formed between said cup and said tube, said tube having its outer end pressure closed to form an interior seal between the walls of said tube, and an electric arc weld at the outer end of said tube whereby a dual seal is formed at the closure end of said tube.

9. In a power element, a diaphragm having an integral actuating boss and annular concentric corrugations, said corrugations when said diaphragm is relaxed being formed substantially about a common plane for approximate linearity of expansion in response to unequal increments of change in the actuating force, and the amplitude of said corrugations being increased gradually from the outer corrugation to the inner corrugation for more perfect linear temperature characteristics when subjected to a vapor pressure force.

10. In a power element, a metal cup having two adjacent integrally connected substantially parallel portions, a metal diaphragm in said cup having a peripheral portion thereof positioned between said substantially parallel portions, said peripheral portion being rigidly connected with each of said substantially parallel portions in a manner to provide a dual hermetic seal between the interior of said diaphragm and the exterior thereof.

11. A power element designed to minimize the possibility of leakage at the joints thereof, comprising a metal cup having integral portions thereof formed to provide a peripheral recess therebetween, a metal diaphragm positioned within said cup and having a peripheral flange located within said peripheral recess, means affording a rigid connection between opposite faces of said flange and the respective walls of said recess to provide a dual hermetic seal between the interior and exterior of said diaphragm, said cup having an opening formed therein, a metal tube having an open end thereof extending into said cup through said opening, and solder connections between the inner and outer surfaces of said cup and said tube whereby a dual hermetic seal is provided between said cup and the adjacent peripheral portions of said tube.

12. In a power element, a diaphragm having an integral actuating boss and annular concentric corrugations, said corrugations when said diaphragm is relaxed being formed substantially about a common plane for approximate linearity of expansion in response to unequal increments of change of the actuating force, and the amplitude of said corrugations being increased gradually from the outer corrugation to the inner corrugation whereby said diaphragm is provided with a more nearly perfect linear temperature characteristic when subjected to a vapor pressure force, said diaphragm being made of resilient metal having a predetermined spring characteristic of sufficient amount to cause said diaphragm to be self-loaded within its designated operating range.

13. In a power element, a cup consisting of a peripheral wall and a re-entrant integral bottom, there being a peripheral recess formed by said wall and said bottom, a diaphragm in said cup having a flange seated in said recess, a continuous seam weld between said flange and the sides of said recess to form a dual seal for said power element, said wall extending beyond said diaphragm and shaped to provide a housing and support for mechanism operated by said diaphragm, said wall carrying on its upper edge two axially spaced sets of lugs, one of which sets is adapted to retain the control elements in assembled relation within said cup, and the other set being adapted to provide for the independent attachment of the complete control to a mounting plate or other suitable support.

References Cited in the file of this patent

UNITED STATES PATENTS

| | | |
|---|---|---|
| 1,628,430 | Ribes | May 10, 1927 |
| 1,819,987 | Hodge | Aug. 18, 1931 |
| 2,058,301 | Doran | Oct. 20, 1936 |
| 2,150,771 | Kolleman | Mar. 14, 1939 |
| 2,206,905 | Leonard | July 9, 1940 |
| 2,323,985 | Fausek | July 13, 1943 |
| 2,478,476 | Good | Aug. 9, 1949 |

FOREIGN PATENTS

| | | |
|---|---|---|
| 101,256 | Great Britain | Aug. 31, 1916 |
| 220,391 | Great Britain | Aug. 18, 1924 |